Nov. 12, 1935.    D. J. DESCHAMPS    2,020,302
FUEL PUMP
Filed Sept. 19, 1930    2 Sheets-Sheet 2
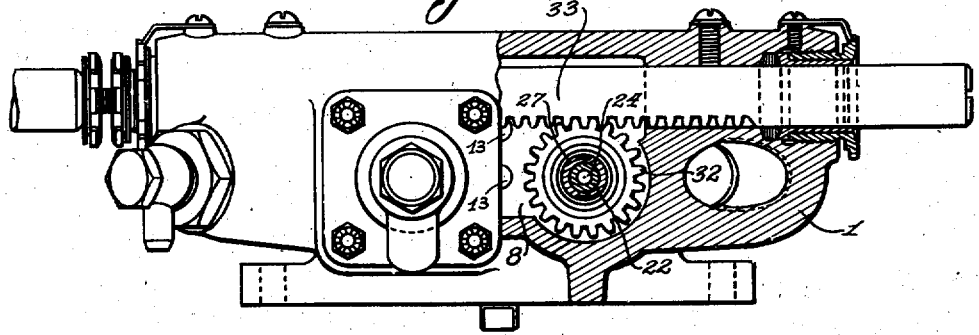
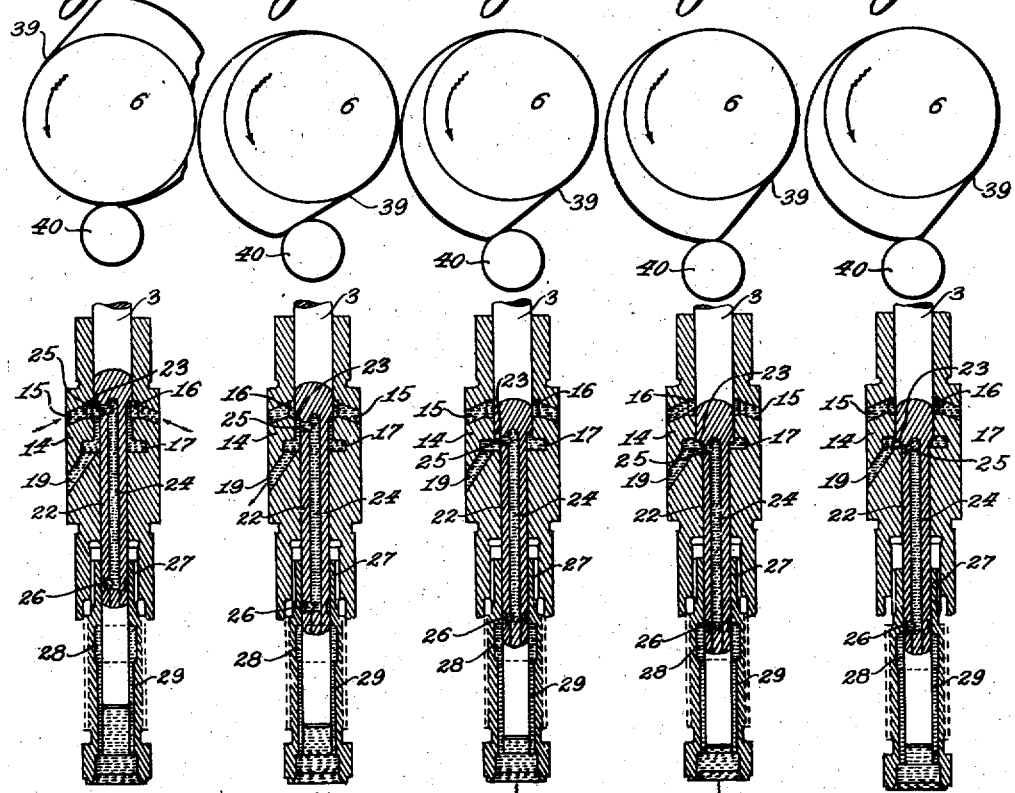
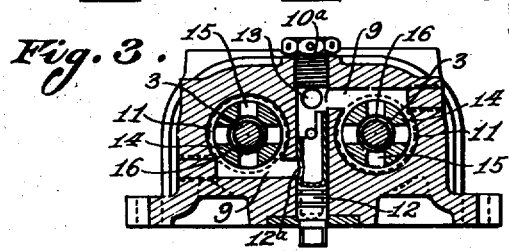
Inventor:
DESIRE J. DESCHAMPS,
His Attorney.

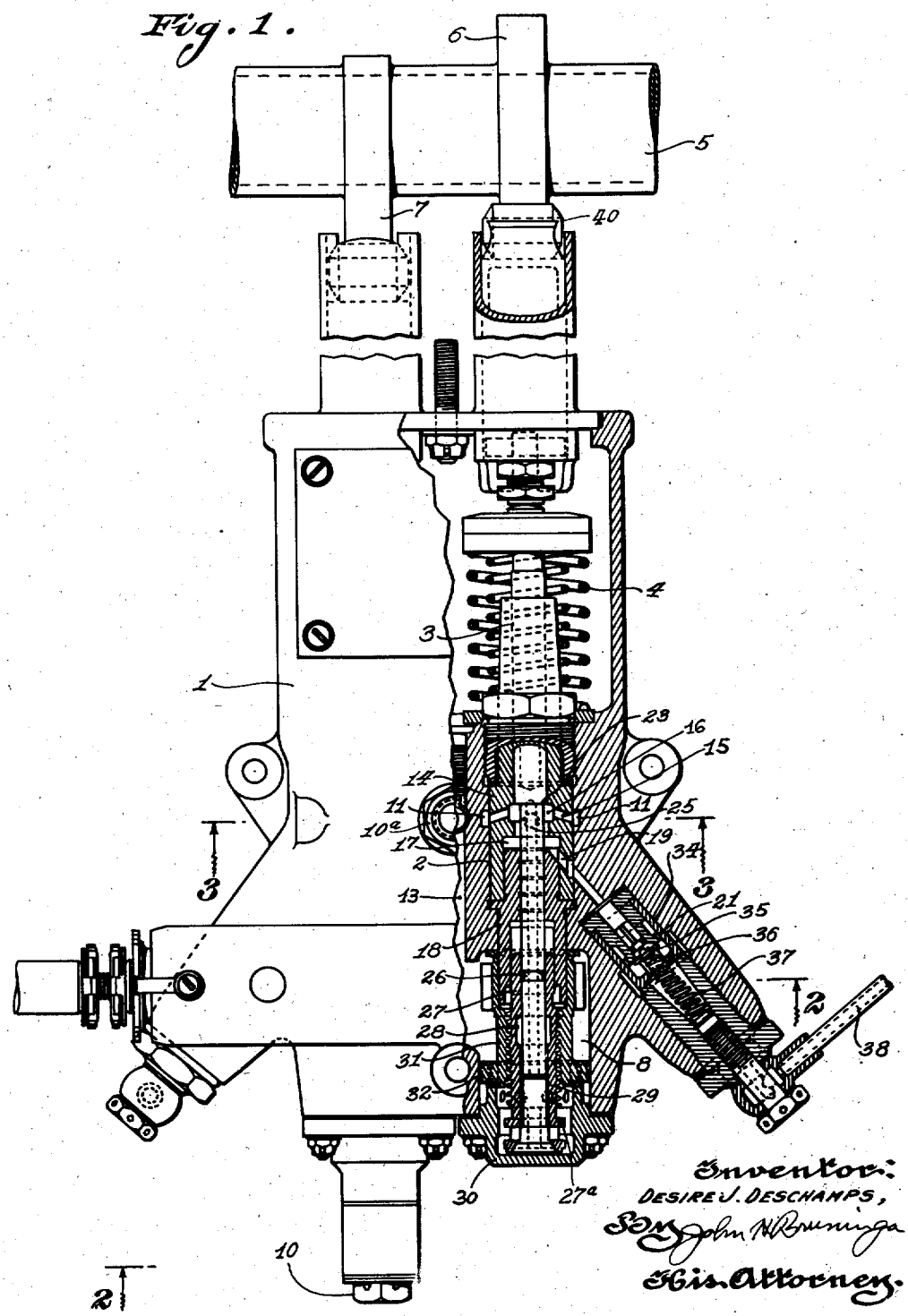

Patented Nov. 12, 1935

2,020,302

UNITED STATES PATENT OFFICE 2,020,302

FUEL PUMP

Desire J. Deschamps, St. Louis, Mo., assignor of one-half to P. De C. Ball, St. Louis, Mo.

Application September 19, 1930, Serial No. 482,955

4 Claims. (Cl. 103—41)

This invention relates generally to fuel pumps, and more particularly to that type of fuel pump which is employed with a Diesel engine for measuring each injection of fuel.

The fuel pumps heretofore employed in this relation have been provided with a number of moving parts whereby to measure the quantity of fuel which is injected into the cylinder of the engine upon each stroke of the pump piston, and great expense for upkeep of such pumps has been encountered incident to the short life of such moving parts. In such pumps of the prior art, which have not employed these auxiliary moving parts for measuring the quantity of fuel per injection and which have sought to measure the quantity of fuel by regulation of the length of the stroke of the plunger, economy and efficiency have both been sacrificed, since the entire injection did not take place during the most rapid movement of the pump piston in which the greatest pressure is applied to the fuel within the pump cylinder. Furthermore, the pumps previously used in industrial and heavy medium speed marine Diesel engines were not capable of operation at the unusually high speeds required in modern light small-sized automotive Diesel engines employed principally for automobile and aircraft purposes. Consequently, high operating speeds of such engines, if not prohibited by the working of the pump, were found most unsatisfactory.

The object of this invention, therefore, is to provide a fuel pump which shall comprise a minimum number of moving parts and shall be positive in operation.

A further object of this invention is to provide a fuel pump in which the quantity of the fuel delivered thereby upon each stroke thereof is accurately measured.

A more specific object of this invention is to provide a fuel pump in which the pressure upon the fuel within the pump is released at a certain point during the stroke of the piston to thereby limit the quantity of fuel delivered by the pump.

Another object of this invention is to provide a fuel pump in which the injection takes place during the maximum speed of the pump piston.

Another object of this invention is to provide a fuel pump for measuring the quantity of fuel delivered and in which the injection always begins at the same point in the movement thereof.

Other objects will become apparent to those skilled in the art when the following description is read in conjunction with the accompanying drawings, in which:—

Figure 1 is a front view shown partly in section to reveal the operating parts of the pump of this invention;

Figure 2 is a bottom view shown partly in section, taken along line 2—2 of Figure 1, and illustrating in detail a device for regulating the quantity of fuel delivered by the pump;

Figure 3 is a sectional view, taken along the line 3—3 of Figure 1, and showing in detail a controlling valve;

Figures 4 to 7, inclusive, are diagrammatical views, illustrating the position of the pump piston in various positions during an injection stroke; and Figure 8 is a diagrammatic view showing the adjustment device in a different adjusted position.

The various figures of the accompanying drawings illustrate a double fuel pump especially designed for a two cycle inverted Diesel aircraft engine, but it is to be understood that the present type of fuel pump can be built in units with single or multiple cylinder barrels and can be employed on all kinds of engines using fuel injection, regardless of the cycle which is followed.

In accordance with this invention, a pair of fuel pumps are provided for each cylinder of an internal combustion engine and the pumps are operated at 180° displacement, so that when one pump is at the compression stroke, the other pump is at its suction or intake stroke. The two pumps are driven from a single cam shaft which operates at a speed equal to one-half the crank shaft speed of the engine, and, accordingly, an injection of fuel is delivered to each cylinder of the engine upon each revolution thereof, although the fuel pumps are operated at but half the speed of the engine. Metering of the fuel by the pump itself is accomplished by the provision of a duct through the pump piston to release the pressure of the confined fuel within the pump cylinder at a predetermined movement of the piston, thereby releasing the pressure on the confined fuel and permitting the operation of a spring valve to discontinue the injection of fuel into the engine cylinder.

Referring now to the drawings, and more particularly to Figure 1, there is shown a pump casing 1, within which is provided a pair of parallel bores 2, each of the bores 2 receiving a piston 3 which is slidably mounted and biased toward its uppermost position by a plurality of springs 4, and a cam shaft 5 is provided having a pair of cams 6, 7, which are disposed in directly opposite relation—that is, so that members actuated thereby will move in 180° displacement. The cams 6 and 7 are arranged to cooperate respectively with the pistons 3 of the bores 2. With such an arrangement it is apparent that upon rotation of the cam shaft 5 the pistons 3 of the respective cylinders will be alternately forced downwardly against the action of the springs 4 to effect an injection stroke.

Within the casing 1 and between the parallel bores 2, a recess 8 is formed which functions as an auxiliary fuel reservoir and pulsation damper between the pump and the fuel line which leads thereto. The reservoir 8 is connected by ducts 13 to a valve 12 and therefrom by ducts 9 to the respective bores 2.

When the pump of this invention is operated in the position shown, fuel enters the pump through 10 to fill the auxiliary reservoir 8 and the different ducts connected therewith. When, after its installation, fuel is for the first time supplied to the pump, air which has been trapped in the fuel line and in the pump will accumulate in the highest portion of the auxiliary reservoir 8, which portion is the bore for the valve 12. This air, which would prevent proper operation of the pump, can readily be released through a plug 10a.

It will be understood that if the fuel pump of this invention is to be used in an inverted position to that shown in the drawings, so that the camshaft is operated beneath the pump, another arrangement has to be used for admitting fuel to the pump. In this case a fuel connection will be installed in place of the plug 10a and the accumulated air will be released at 10.

As clearly illustrated in Figure 3, the valve 12 comprises a tube having an aperture 12a extending through the wall thereof. In the position shown, the aperture 12a is in such position that fuel is admitted from the reservoir 8 through a duct 13 to the inside of valve 12 and conducted through the valve 12 to be delivered by aperture 12a to the duct 9 which leads to the bore 2 of the left pump cylinder. The valve 12 may be rotated into another position in which the aperture 12a does not align itself with the duct 9 to thereby interrupt the supply of fuel to that side of the pump without interfering with the supply of fuel to the other side, which latter is in direct connection with the duct 13.

Within the bore 2 is mounted a bushing 14 within which the piston or plunger 3 is movable so that this bushing forms in effect the cylinder barrel of the pump. The bushing 14 is provided with a plurality of openings 15, as clearly illustrated in Figure 3, which extend through the wall of the bushing to connect the groove 11 with the inside of the cylinder, and it is through these openings 15 that fuel is admitted to the inside of the cylinder from the reservoir and the groove 11. At the inner extremity of these openings 15, an enlarged portion 16 is provided within the bushing, within which a supply of fuel may accumulate, during the movement of the piston 3, within the cylinder 14.

The compression chamber of the cylinder comprises a recess 17 which is, in effect, a groove similar to the groove 16 at the inlet port, but which is formed between the bushing 14 and a co-operating gland member 18, and a duct 19 which leads from the recess 17 to the valve organization 21, to be later described.

The gland 18, which co-operates with the bushing 14 and holds the latter in position, is provided with a bore aligned with the bore within the bushing 14 but of smaller diameter than the bore within the bushing 14, and it will be observed that the plunger 3 is provided with an extended portion 22 of smaller diameter than the main portion thereof, so that a shoulder 23 is formed on the plunger or piston 3 and is movable within the bore of the bushing 14 to apply a pressure to the fuel confined within the cylinder barrel 14 between the grooves 16 and 17, at which time the extended portion 22 of the plunger 3 operates in conjunction with the gland 18 as a guide for the movement of the plunger. The extended portion 22 of the plunger is hollow, such as shown at 24, and a hole 25 is cut through the wall thereof to connect the tube 24 to the outside of the plunger near the shoulder 23 thereof, and similarly at the other end of the extended portion 22, a hole or outlet 26 is provided so that there exists a passageway through the extended portion 22 of the plunger from the cylinder, but this passageway has its outlet 26 closed during the injection stroke of the piston by engagement with the wall of the gland 27. It is understood, of course, that a plug is inserted in the outer end of the tube 24 to prevent the escape of fuel through that path.

The gland 27 is provided around its inner wall with a groove 28 which is in direct fluid connection thru passages 29 with the reservoir 8, and it will be observed that when during the movement of the plunger 3 with its extended portion 22, the outlet 26 comes into position adjacent the groove 28, the outlet 26 will be opened and permit the fuel within the cylinder 14 to flow outwardly through the passage 24 and return to the reservoir 8.

About its outer surface, the gland 27 is provided with threads which are in engagement with female threads upon a cooperating member 31 and at its upper portion the member 31 is provided about its periphery with gear teeth 32, as clearly illustrated in Figure 2, which are disposed for co-operation with a rack 33. The gland 27 is provided with a rib 27a, which is splined to a cap 30. It is thus clear that the gland 27 can be moved up and down under the action of its adjusting mechanism, but is held against rotation relative to the housing. It is thus apparent that when the rack 33 is moved outwardly or inwardly, a rotation of the member 31 takes place, which, through the interaction of the threads within the member 31 and on the outside of the gland 27, causes the gland 27 to move vertically and thereby effect a variation in the position of the groove 28 to consequently vary the point in the movement of the piston at which the outlet 26 will be opened to permit a release of the pressure upon the fuel confined within the cylinder 14 between the grooves 16 and 17 and in this way the measured quantity of fuel delivered by the pump upon each injection may be varied.

The outlet of the cylinder consists in a duct 19 leading into a recess 34 and within this recess 34 is mounted the valve organization 21, comprising a spring-loaded valve 35 which is normally held in engagement with its seat 36 by the operation of a spring 37. Thus, when sufficient pressure is applied to the fuel within the cylinder 14 between the grooves 16 and 17 by the downward movement of the shoulder 23 of the piston or plunger 3, the valve 35 will be forced from its seat 36 to permit the escape of fuel to the fuel line 38, which leads to the engine. Moreover, when insufficient pressure is applied to the fuel confined within the cylinder 14 to force the valve 35 open against the action of the spring 37, it will be clearly seen that the supply of fuel to the fuel line 38 is positively cut off.

The operation of the pump may be readily understood by reference to Figures 4 to 7, inclusive. In Figure 4, the plunger 3 is illustrated with the shoulder 23 in its topmost position at which the shoulder 23 is disposed above the groove 16 of the cylinder and when the parts are in this position, fuel will be admitted through the openings 15 in the direction of the arrow to fill all the recesses which are then connected therewith and which include openings 15, groove 16, groove 17, that portion of the cylinder between the grooves 16 and 17, outlet 19, as well as the tube 24 within the extended portion 22 of the plunger 3. When the parts are in this position, it will be clearly observed that the opening 26 is closed, since it is completely surrounded by the walls of the gland 27, and accordingly no fuel can escape through this passage when the parts are in position illustrated in Figure 4. The parts remain in this position for a considerable perod of time, during which the cam shaft rotates from the position shown to the position in which the point 39 comes into contact with the follower 40, whereby the intake period is lengthened to assure that the cylinder becomes filled before the beginning of the injection stroke. The rotation of the cam shaft is in the direction indicated by the arrow so that downward movement of the plunger 3 commences at the position where the point 39 of the cam 6 comes into contact with the follower 40, directly connected with the stem of the plunger 3, and the plunger is moved into the position shown in Figure 5. In Figure 5, the position of the plunger is such that the supply of fuel from the inlet port 15 has just been cut off, since the shoulder 23 of the plunger is disposed just below the bottom edge of the groove 16, and it is in this position that pressure is first appled to the fuel confined within the cylinder. It is to be observed that the groove 16 is in fixed position relative to the body of the pump so that the beginning of the injection stroke will also take place at the same point in the movement of the piston, and consequently the injection to the engine will always occur at the same time during the cycle thereof. In Figure 5, it will be observed that even though the plunger 3 is moved downwardly relative to the cylinder 14 for a considerable distance, the outlet 26 for the tube 24 within the extended portion 22 of the plunger 3 is still closed by direct contact with the walls of the gland 27, and accordingly emission of fuel by the outlet 26 is prevented when in this position. Since all outlets are closed when in this position and the plunger 3 is being forced downwardly by the action of the cam 6, the plunger traveling at its maximum speed, pressure is applied to the fuel confined within the cylinder, so that the valve 35 is forced open and the fuel within the cylinder is forced outwardly through the duct 19 and past the valve 35, as illustrated in Figure 1.

Figure 6 illustrates the pump parts in a position near the end of the injection stroke. Although in Figure 6 the fuel is as yet under pressure, it will be observed that the bottom edge of the outlet 26 is adjacent to the upper edge of the groove 28 in the gland 27, so that the slightest further downward movement of the plunger will bring the outlet 26 into contact with the groove 28 and open the passage through the tube 24 to release the pressure upon the fuel confined within the cylinder and permit the closure of valve 35 to discontinue the supply of fuel to the engine.

In Figure 7, the parts are shown in that position in which the outlet 26 has come into engagement with the groove 28 to open the passage 24 through the extended portion 22 of the plunger 3 and to permit the escape of fuel within the cylinder through the passage 24 during the latter part of the downward movement of the plunger 3. When the fuel is forced through the passage 24 and into the groove 28, it returns to the reservoir 8 through the passage 29, as previously described.

When the plunger 3 has reached its lowermost position, as illustrated in Figure 7, having completed an injection stroke, the plunger is then forced upwardly by the action of springs 4, which upward movement is restrained by the cam 6 so that the upward movement of the plunger 3 is gradual and a vacuum is created within the cylinder so that an inrush of fuel occurs when the shoulder 23 with the plunger 3 again moves past the lower edge of the groove 16 to permit an opening of the inlet port.

In Figure 8, the plunger 3 is shown in the same position as that shown in Figure 7, but the gland 27 is shown in a different position; the adjustment having been effected through the operation of the rack 33, so that even when the plunger is in its lowermost position, as illustrated, the outlet 26 for the tube 24 has not yet come into contact with the groove 28, so that no release of the pressure upon the fuel confined within the cylinder occurs when the gland 27 is adjusted in this position. When the gland 27 is disposed in position shown in Figure 8, the maximum volume of fuel is injected by the pump, since, as is clearly illustrated, the pressure upon the fuel is not released by the opening of outlet 26 even at the end of the stroke of the plunger 3. The gland 27 may be moved upwardly to a position in which the outlet 26 will lie adjacent the groove 28 when the plunger 3 is in the position shown in Figure 5, and when in such adjustment, it is apparent that no fuel will be forced through the valve 35, and accordingly the motor may be stopped in this way. It, however, is to be distinctly understood that the gland 27 may assume any position between that illustrated in Figure 8 and the stop position, so as to vary the charge of fuel per stroke of the plunger 3, and it may well be pointed out that although there are two pumps disposed within the casing 1, the parts of each pump are identical with the parts of the other and that when an adjustment of the gland 27 for one pump takes place, the same adjustment of the gland 27 for the other pump takes place, since the rack 33 is in contact with the gear teeth 32 for adjusting both pumps, and consequently the charge of fuel alternately delivered by each pump is of exactly the same quantity.

From the above description of the operation of the fuel pump, it will be noted that the high pressure obtained within the cylinder does not affect the easy operation of the fuel metering device. There being no reaction upon this mechanism, the rack 33 can be freely moved to regulate the output of the pump under all speed and load conditions of the engine.

Since it is apparent that many modifications will present themselves to those skilled in the art and that many sub-combinations are of utility which shall not depart from the spirit of this invention and the scope of the appended claims, it is to be distinctly understood that the embodiment here shown and described shall be construed as merely illustrative and shall not be taken in a limiting sense.

Having thus described the invention, what is claimed is:

1. In a fuel pump, a cylinder having a compression chamber provided with inlet and outlet ports and a reduced portion extending beyond said chamber, a plunger operable in said chamber having an extended part guided in said reduced portion of the cylinder and sealing the same against the escape of fuel from said chamber, said extended part having an opening therethrough communicating with the chamber for permitting the escape of fuel from said cylinder, and adjustable means engaging said extended part for closing said opening, said means having a relieved portion adapted to cooperate with said opening at a predetermined position of the plunger.

2. In a fuel pump, a cylinder provided with an inlet port in the peripheral wall thereof and an outlet port therebeyond, a plunger having a portion in sealing relation to the peripheral wall of said cylinder and movable therein across the inlet port, a by-pass through said plunger, and by-pass controlling means adjustable to a fixed position at a variable distance from the inlet and beyond said outlet port.

3. In a fuel pump for internal combustion engines, a cylinder having a compression chamber connected to supply fuel to the engine and provided with inlet and outlet ports, a plunger having a shoulder at its intermediate portion movable across said inlet port to compress fuel in said chamber, said plunger having an exension beyond said outlet port provided with a passage therealong communicating with said chamber, and means adjustable to open the outer end of said passage to relieve the pressure in said chamber at a variable point in the stroke of said plunger.

4. In an internal combustion engine, a fuel supply unit comprising, a casing, a pair of pumps housed in said casing, a fuel reservoir in said casing communicating with and providing the sole fuel supply for said two pumps only; each of said pumps having a cylinder provided with a compression chamber connected to deliver fuel to the engine, a plunger operating in said chamber having a ported, extended part guided in a reduced portion of the cylinder and sealing same against escape of fuel from the chamber, and means cooperating with said ported plunger adapted to relieve the pressure in said compression chamber into said reservoir at a definite point in the stroke of said plunger; and means for operating said plungers in opposite time phase relation.

DESIRE J. DESCHAMPS.

---

CERTIFICATE OF CORRECTION.

Patent No. 2,020,302.　　　　　　　　　　　　　　　　　November 12, 1935.

DESIRE J. DESCHAMPS.

It is hereby certified that error appears in the printed specification of the above numbered patent requiring correction as follows: Page 4, first column, line 15, claim 1, after "part" insert the words of said plunger; and that the said Letters Patent should be read with this correction therein that the same may conform to the record of the case in the Patent Office.

Signed and sealed this 17th day of December, A. D. 1935.

Leslie Frazer (Seal)　　　　　　　　　　　　　　　　　　　　　Acting Commissioner of Patents.

vention and the scope of the appended claims, it is to be distinctly understood that the embodiment here shown and described shall be construed as merely illustrative and shall not be taken in a limiting sense.

Having thus described the invention, what is claimed is:

1. In a fuel pump, a cylinder having a compression chamber provided with inlet and outlet ports and a reduced portion extending beyond said chamber, a plunger operable in said chamber having an extended part guided in said reduced portion of the cylinder and sealing the same against the escape of fuel from said chamber, said extended part having an opening therethrough communicating with the chamber for permitting the escape of fuel from said cylinder, and adjustable means engaging said extended part for closing said opening, said means having a relieved portion adapted to cooperate with said opening at a predetermined position of the plunger.

2. In a fuel pump, a cylinder provided with an inlet port in the peripheral wall thereof and an outlet port therebeyond, a plunger having a portion in sealing relation to the peripheral wall of said cylinder and movable therein across the inlet port, a by-pass through said plunger, and by-pass controlling means adjustable to a fixed position at a variable distance from the inlet and beyond said outlet port.

3. In a fuel pump for internal combustion engines, a cylinder having a compression chamber connected to supply fuel to the engine and provided with inlet and outlet ports, a plunger having a shoulder at its intermediate portion movable across said inlet port to compress fuel in said chamber, said plunger having an exension beyond said outlet port provided with a passage therealong communicating with said chamber, and means adjustable to open the outer end of said passage to relieve the pressure in said chamber at a variable point in the stroke of said plunger.

4. In an internal combustion engine, a fuel supply unit comprising, a casing, a pair of pumps housed in said casing, a fuel reservoir in said casing communicating with and providing the sole fuel supply for said two pumps only; each of said pumps having a cylinder provided with a compression chamber connected to deliver fuel to the engine, a plunger operating in said chamber having a ported, extended part guided in a reduced portion of the cylinder and sealing same against escape of fuel from the chamber, and means cooperating with said ported plunger adapted to relieve the pressure in said compression chamber into said reservoir at a definite point in the stroke of said plunger; and means for operating said plungers in opposite time phase relation.

DESIRE J. DESCHAMPS.

CERTIFICATE OF CORRECTION.

Patent No. 2,020,302. November 12, 1935.

DESIRE J. DESCHAMPS.

It is hereby certified that error appears in the printed specification of the above numbered patent requiring correction as follows: Page 4, first column, line 15, claim 1, after "part" insert the words of said plunger; and that the said Letters Patent should be read with this correction therein that the same may conform to the record of the case in the Patent Office.

Signed and sealed this 17th day of December, A. D. 1935.

(Seal)

Leslie Frazer
Acting Commissioner of Patents.